US012728694B2

(12) United States Patent
Cieszynski et al.

(10) Patent No.: US 12,728,694 B2
(45) Date of Patent: Sep. 8, 2026

(54) HEAT EXCHANGER

(71) Applicant: Aptiv Technologies AG, Schaffhausen (CH)

(72) Inventors: Michal Cieszynski, Cracow (PL); Monika Pieszka, Cracow (PL); Miroslaw Gorol, Cracow (PL); Pawel Kozak, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/236,814

(22) Filed: Aug. 22, 2023

(65) Prior Publication Data

US 2025/0065690 A1 Feb. 27, 2025

(30) Foreign Application Priority Data

Aug. 22, 2022 (EP) .................................... 22191535

(51) Int. Cl.
*B60H 1/00* (2006.01)
*F28D 7/00* (2006.01)
(Continued)

(52) U.S. Cl.
CPC ....... *B60H 1/00328* (2013.01); *F28D 7/0025* (2013.01); *F28D 9/005* (2013.01);
(Continued)

(58) Field of Classification Search
CPC ... B60H 1/00328; B60K 11/04; F28D 7/0025; F28D 9/005; F28D 2021/0031;
(Continued)

(56) References Cited

U.S. PATENT DOCUMENTS 6,730,425 B2 * 5/2004 Ishikawa ........... H01M 8/04029 429/437
9,365,091 B2 * 6/2016 Pekarsky ........... H01M 10/625
(Continued)

FOREIGN PATENT DOCUMENTS

CN 101546836 B * 7/2012 ........... F24H 3/0476
CN 108544903 A 9/2018
(Continued)

OTHER PUBLICATIONS

Clarivate Analytics Translation of "Intermediate Heat Exchanger for Fuel Cell", JP 2003282112 A, published Oct. 3, 2003, translation copyrighted by Clarivate Analytics 2025. (Year: 2025).*
(Continued)

*Primary Examiner* — Ljiljana V. Ciric
(74) *Attorney, Agent, or Firm* — Billion & Armitage

(57) ABSTRACT

A heat exchanger for a vehicle heat management system including a first cooling loop and a second cooling loop which is separate from the first cooling loop. The heat exchanger is configured to enable a thermal coupling of the first cooling loop and the second cooling loop. In a coupled condition, the first cooling loop, the second cooling loop and the heat exchanger are configured such that heat can be dissipated from one or more vehicle elements of a vehicle to the first cooling loop and can be further dissipated from the first cooling loop to the second cooling loop via the heat exchanger. The heat exchanger is configured to electrically isolate the first cooling loop from the second cooling loop.

16 Claims, 3 Drawing Sheets

(51) Int. Cl.

| | |
|---|---|
| ***F28D 9/00*** | (2006.01) |
| ***F28D 21/00*** | (2006.01) |
| ***F28F 3/00*** | (2006.01) |
| ***F28F 13/00*** | (2006.01) |
| ***H01M 10/613*** | (2014.01) |
| ***H01M 10/615*** | (2014.01) |
| ***H01M 10/625*** | (2014.01) |
| ***H01M 10/6568*** | (2014.01) |
| ***H01M 10/663*** | (2014.01) |

(52) U.S. Cl.

CPC ........... *F28F 3/005* (2013.01); *H01M 10/613* (2015.04); *H01M 10/615* (2015.04); *H01M 10/625* (2015.04); *H01M 10/6568* (2015.04); *H01M 10/663* (2015.04); *F28D 2021/0031* (2013.01); *F28D 2021/0043* (2013.01); *F28F 2013/006* (2013.01); *F28F 2265/24* (2013.01); *H01M 2220/20* (2013.01)

(58) Field of Classification Search

CPC .............. F28D 2021/0043; F28F 3/005; F28F 2013/006; F28F 2265/24; F28F 3/00; H01M 10/613; H01M 10/615; H01M 10/625; H01M 10/6568; H01M 10/663; H01M 2220/20

See application file for complete search history.

(56) References Cited

U.S. PATENT DOCUMENTS

| | | | | |
|---|---|---|---|---|
| 9,373,873 | B2 * | 6/2016 | Lev | H01M 10/613 |
| 10,826,140 | B2 * | 11/2020 | Harris | H01M 10/6552 |
| 11,108,100 | B2 * | 8/2021 | Harris | H01M 10/613 |
| 11,302,936 | B2 * | 4/2022 | Fukaya | H01M 8/04029 |
| 11,728,496 | B2 * | 8/2023 | Champagne | H01M 8/249 180/65.31 |
| 11,728,535 | B2 * | 8/2023 | Samie | H01M 50/249 429/120 |
| 11,742,536 | B2 * | 8/2023 | Harris | H01M 10/6552 429/120 |
| 11,742,539 | B2 * | 8/2023 | King | H01M 50/211 429/120 |
| 11,742,540 | B2 * | 8/2023 | Bourke | B60L 58/26 429/120 |
| 11,967,688 | B2 * | 4/2024 | Harris | H01M 10/6557 |
| 12,040,465 | B2 * | 7/2024 | Desbois-Renaudin | H01M 10/643 |
| 12,080,864 | B2 * | 9/2024 | Boddakayala | H01M 10/613 |
| 2002/0009648 | A1 * | 1/2002 | Buchner | H01M 8/04119 429/456 |
| 2009/0239106 | A1 * | 9/2009 | Whitehead | F24H 1/009 165/42 |
| 2011/0206967 | A1 * | 8/2011 | Itsuki | H01M 10/6556 429/120 |
| 2017/0088008 | A1 | 3/2017 | Melendez et al. | |
| 2019/0366876 | A1 * | 12/2019 | Cheadle | F28D 1/035 |
| 2021/0269643 | A1 | 9/2021 | Zheng et al. | |
| 2022/0314837 | A1 * | 10/2022 | Gupta | B60L 58/26 |
| 2024/0145838 | A1 * | 5/2024 | Bockman | H01M 10/653 |
| 2024/0234871 | A1 * | 7/2024 | Björneklett | H01M 10/613 |
| 2024/0396112 | A1 * | 11/2024 | Dawley | H01M 50/547 |
| 2025/0065690 | A1 * | 2/2025 | Cieszynski | F28D 9/005 |
| 2025/0279518 | A1 * | 9/2025 | Kirmani | H01M 50/207 |
| 2025/0309456 | A1 * | 10/2025 | King | B60L 50/60 |

FOREIGN PATENT DOCUMENTS

| | | | | | |
|---|---|---|---|---|---|
| CN | 105849968 | B | * | 5/2019 | H01M 10/486 |
| CN | 111615758 | A | * | 9/2020 | H01M 10/615 |
| CN | 113169409 | A | * | 7/2021 | H01M 50/204 |
| DE | 102012222635 | A1 | * | 6/2014 | B60H 1/00478 |
| DE | 112019001128 | T5 | * | 12/2020 | H01M 50/204 |
| DE | 102023202338 | A1 | * | 9/2024 | H01M 50/209 |
| EP | 1172873 | A2 | * | 1/2002 | H01M 8/04029 |
| EP | 4120433 | A1 | * | 1/2023 | H01M 10/613 |
| EP | 4324888 | A1 | * | 2/2024 | C09D 5/00 |
| EP | 4328535 | A1 | * | 2/2024 | H01M 10/663 |
| JP | 2003282112 | A | * | 10/2003 | F28D 9/0043 |
| WO | WO-2019227221 | A1 | * | 12/2019 | B60L 58/26 |
| WO | WO-2023041086 | A1 | * | 3/2023 | H01M 50/121 |
| WO | WO-2024146729 | A1 | * | 7/2024 | B60K 11/02 |
| WO | WO-2024188933 | A1 | * | 9/2024 | H05K 7/20727 |

OTHER PUBLICATIONS

English Abstract of JP Application No. 2002086038; 1 page.

Extended European Search Report for Application No. 22191535.8; Dated Feb. 7, 2023; 6 pages.

* cited by examiner

C53
B53
21
41A
26
36
41A
23
40
A53 C53 A52
41A
41B
41C
41D
41E
25C 25B 25A
40
35A
31
25B
35B
25A
25C
35C
36
21
26
33
23
40
31
41E
41D
41C
35A
35B
35C
41B
41A
25C
25B
25A
40

HEAT EXCHANGER

CROSS-REFERENCE TO RELATED APPLICATION

This application claims benefit of priority to European Patent Application No. 22191535.8 filed on Aug. 22, 2022, the entire disclosure of which is hereby incorporated by reference.

TECHNICAL FIELD OF THE INVENTION

The invention relates to the field of heat exchangers for heat management systems for vehicles, a respective heat management system, a corresponding vehicle, and a method for managing heat in a vehicle.

BACKGROUND

Heat management is an important aspect for ensuring a safe and reliable operation of vehicles. Heat may be for instance introduced from the ambient outside or is generated internally by operation of a combustion engine or by electrically powered elements, such as light, air condition, and a multitude of further electrical control and support components. Furthermore, electrically driven vehicles, such as battery electric vehicles (BEVs), comprise a traction battery, which is operated and charged under high voltages and large currents. Operation of electric elements generally leads to an additional generation of significant amounts of heat in a vehicle. The occurrence of large amounts of heat, however, regularly impairs operability of respective vehicle elements and can even damage or destroy them. Excessive heat may further affect electric cables, wherein the capacity of current is undesirably limited in case of an excessive heating. To ensure a faultless operation and avoid damage of vehicle elements, it is therefore important to prevent an accumulation of excessive heat in the vehicle. In the art, this is generally addressed by providing cooling means to dissipate and reduce the heat in a vehicle. However, said cooling means must be often arranged in the vicinity of the elements to be cooled, which can cause safety problems. In case of a malfunction of the cooling means and/or the nearby electric elements to be cooled, there is a risk of an electric short circuit between the electric elements and the cooling means, which may severely harm persons or damage further elements.

It is therefore an object of the present invention to provide a secure and reliable way to manage heat transfer in a vehicle.

SUMMARY

A heat exchanger for a vehicle heat management system is presented herein. The heat exchanger is configured to enable a thermal coupling of a first cooling loop and a second cooling loop of the vehicle heat management system. The first cooling loop, the second cooling loop and the heat exchanger are configured such that, in a coupled condition, heat can be dissipated from one or more vehicle elements of a vehicle to the first cooling loop and can be further dissipated from the first cooling loop to the second cooling loop via the heat exchanger. The heat exchanger is configured to electrically isolate the first cooling loop from the second cooling loop.

Thus, due to the electric decoupling of the two cooling loops, it can be ensured that no electrical current is unintentionally transferred from one cooling loop to the other cooling loop. This may occur, for instance, in case of malfunction of a vehicle element. If said element, which may be cooled by the first cooling loop, is for instance electrically powered, upon damage of said element, a dangerous short circuit in the second cooling loop may be accordingly prevented. That is, in case of a malfunction or damage, only one cooling loop is affected while the other cooling loop remains unaffected and can thus be operated safely. Thus, safety of the heat management system is accordingly improved. At the same time, a suitable heat exchange between the two cooling loops is ensured due to the thermal coupling of the two cooling loops via the heat exchanger. Hence, even in case of damage or malfunction of an element and an electrification of one cooling loop, the other cooling loop and further elements connected or in the vicinity of the other cooling loop may be electrically isolated and therefore protected from the dangerous current.

A cooling loop can be generally understood as a heat conducting circuit, which allows a heat uptake at a first location and a transport through the cooling loop towards a different second location, thus reducing the heat at the first location. The temperatures of the first and second cooling loops may be accordingly adapted such that a heat transfer from the first cooling loop to the second cooling loop can be ensured. The first cooling loop and the second cooling loop are separated and may accordingly not form a single loop. A separation may be understood as a full spatial separation, which, however, does not prevail that respective intermediate means can be arranged between the separate loops, e.g., for a mechanical or thermal coupling. In another embodiment, also the second cooling loop may be configured to provide heat dissipation from one or more vehicle elements. In a further embodiment, also more than two cooling loops may be provided.

A heat exchanger is generally understood as a means for enhancing or enabling a proper heat transport from one cooling loop to another cooling loop. Hence the heat exchanger may be made of any suitable material comprising a high thermal conductivity. The heat exchanger may therefore be suitably thermally connected to the first loop and the second loop such that heat can be effectively transferred from one loop to the other. In some embodiments, the heat exchanger may be a cross-plate or crossflow heat exchanger.

A vehicle is generally to be understood as a means for transport of goods and/or persons. This encompasses, for instance but not limited to, electric vehicles (EV), battery electric vehicles, hybrid electric vehicles (HEV), plug-in hybrids (PHEV). However, non-electric vehicles are also encompassed. It is noted that, although the further description of the present invention is particularly made with respect to cars, the present invention is not limited thereto but also encompasses any other type of vehicles used for transportation of goods and/or persons, such as ships or airplanes etc.

A vehicle element can be, for instance, an electrically powered element of a vehicle, such as a battery, or cables or can be a non-electrically powered element such as a mechanical component or be a part of the motor or a part of an exhaust gas system from which heat should be dissipated. The cooling loop and the vehicle elements may be suitably arranged with respect to each other, e.g., brought into spatial vicinity to each other, such that heat emitted from the vehicle element can be properly uptaken by the first loop and then transported away from the respective vehicle element. This may include a direct contact of the first loop and the vehicle element to be cooled or may include a respective spaced arrangement, as long as the desired amount of heat can be properly transferred away from the respective vehicle element.

In a preferred embodiment, the heat exchanger comprises at least one first hollow flow plate connected to the first cooling loop and at least one second hollow flow plate connected to the second cooling loop, wherein the hollow flow plates comprise one or more flow channels for allowing a cooling agent to flow through, wherein the hollow flow plates are arranged opposite each other and define a gap in between so that the plates are not in electrical contact with each other. Thus, a spatial separation of the first and second cooling agents flowing through the first and second cooling loop can be ensured. The gap may be sufficiently dimensioned to allow thermal conductivity, while preventing an electrical contact between the surfaces of the first and second hollow flow plates. The hollow flow plates may be adapted to fully enclose the respective cooling agents. The one or more flow channels may extend only via a portion of the respective hollow plate or may fully span through the hollow plate. The flow channels may direct the flow of cooling agent in a desired manner, e.g., in a respective vertical, horizontal, or diagonal direction. The hollow flow plates may be accordingly dimensioned, in particular in the thickness dimension, that they provide a sufficient electrical insulation and thermal conductivity between the hollow flow plates. In a preferred embodiment, at least one thermal pad is provided in the gap, wherein the thermal pad comprises a dielectric material, which is configured to thermally couple the first hollow flow plate and the second hollow flow plate with each other and electrically isolate the first hollow flow plate from the second hollow flow plate. The use of two separate liquid circuits separated by a dielectric exchanger advantageously reduces the requirement to use a dielectric cooling liquid and at the same time protects a user or further element against electric shock in the case of an unexpected current flow. A thermal pad may be an element to be introduced into the gap, which may comprise a thermal conductivity in a range of about 15 W/mK to 1.5 W/mK, preferably of about 6 W/mK to 1.5 W/mK. However, the thermal pad may also comprise higher or lower thermal conductivities. Non-limiting examples for a suitable thermal pad may be available under the trade name "PARKER THERM-A-GAP™ 61-08-0505-G579-3 W/mK" and "BERGQUIST® GAP PAD® TGP HC5000-5 W/mK". The thermal pad may be dimensioned to fill the gap partly or completely. Furthermore, the thermal pad may or may not contact one or more of the adjacent hollow flow plates.

In a preferred embodiment, the heat exchanger comprises a plurality of first hollow flow plates and a plurality of second hollow flow plates, the first hollow flow plates and second hollow flow plates are arranged alternately in series forming respective gaps in between, wherein in each gap at least one thermal pad is arranged. The heat exchanger may be accordingly made of hollow flow plates arranged in series, separated by respective thermal pads, which ensure thermal conductivity and, at the same time, electrically isolate the hollow flow plates. By isolating circuits of cooling liquids, it may be possible to reduce or even omit expensive and ineffective dielectric cooling agents such as dielectric liquids.

According to the present invention, a particular compact heat exchanger may be provided, having sufficient heat exchanging capacities to drain and dissipate heat emitted by the vehicle elements. The heat exchanger may comprise three first hollow flow plates arranged in series and connected to the first cooling loop via the first cooling loop inlet and the first cooling loop outlet, and three second hollow flow plates arranged in series and connected to the second cooling loop via the second cooling loop inlet and the second cooling loop outlet, wherein the first and second hollow flow plates may be arranged alternately, thus forming five gaps in between and wherein in each gap at least one thermal pad may be arranged. This may provide for a particular compact and effective arrangement for the configuration of the heat exchanger.

In a preferred embodiment, the first and second hollow flow plates each comprise at least one inlet to allow an inflow of cooling agent into the hollow flow plates and at least one outlet to allow an outflow of cooling agent from the hollow flow plates. The inlet and outlet may be dimensioned to allow sufficient in and outflow of cooling agent. The in- and outlets of the hollow flow plates may comprise the same or different shape and size. In case a plurality of hollow flow plates is provided, the inlet may be connected to a first one of the plurality of hollow flow plates, while this hollow flow plate is then further connected to the other ones of the plurality of hollow flow plates. Thus, an inflow of cooling agent through the first one of the plurality of hollow flow plates towards the further hollow flow plates may be achieved. Similarly, the outlet may be connected to a first one of the plurality of hollow flow plates, while this hollow flow plate is further connected to the other ones of the plurality of hollow flow plates. Thus, an outflow of cooling agent through the first one of the plurality of hollow flow plates towards the further connected hollow flow plates may be achieved. In another embodiment each of the hollow flow plates may comprise one or more inlets and/or one or more outlets.

In a preferred embodiment, the first and second hollow flow plates have an essentially rectangular shape, wherein the inlets and outlets are arranged in diagonally opposite corners of the hollow flow plates to allow an essentially diagonal flow of fluid through the hollow portions of the plates. Thus, the flow of adjacent first and second hollow flow plates advantageously exchanges the heat in a particular efficient manner. It is noted that an "essentially diagonal flow" is not to be understood in strictly diagonal manner but may be understood as a general flow from one corner to another corner with respect to the main surface of the rectangular hollow flow plate. This does not preclude that the hollow flow plates comprise one or more portions in which the flow is directed in a horizontal or vertical manner with respect to the main surface of the hollow flow plates. In another embodiment, the flow through the first and second hollow flow plates may be fully horizontal or vertical with respect to the main surface of the hollow flow plate. Further, the flow may be directed in a same or different way in the first and second hollow flow plates.

In a preferred embodiment, the thermal pad comprises a solid body. Preferably, the thermal pad is a solid body. Hence, the thermal pad may allow to thermally couple and at the same time electrically insulate the two cooling loops. The solid body may accordingly separate the two cooling loops and fill the respective gaps between hollow flow plates of the heat exchanger. The solid body may be accordingly made of or comprise respective electrically insulating materials that also have a suitable thermal conductivity. The dimensions of the solid body, e.g., its thickness, may be adapted to the desired thermal coupling and/or electrical insulation to be obtained.

Further, the present invention proposes a vehicle heat management system comprising a first cooling loop, and a second cooling loop, which is separate from the first cooling loop, and the heat exchanger as described above. Thus, a safe and reliable way for heat transfer in the vehicle can be provided, wherein, on the one hand, a proper heat conduction is ensured, while at the same time, safety of the heat management system is improved, since the first and second cooling loops are electrically separated.

In a preferred embodiment, the second cooling loop is connected to a heat sink, preferably a radiator, configured to dissipate heat from the second cooling loop to an environment. Providing a heatsink generally allows an effective heat dissipation from the second cooling loop. The heatsink may be formed by any suitably means for drawing heat from the second cooling loop. This heat sink may be an integral part of the second cooling loop or can be a separate element, which may be thermally coupled to the second cooling loop. A radiator may comprise elements for providing an increased surface and therefore an increased contact with the environment, such as lamellas or projections to suitably increase the heat dissipation from the radiator to the environment. The radiator may be made of any suitable material comprising a sufficiently high thermal conductivity. Further heat dissipating elements may be provided in addition or instead to the heatsink to further dissipate heat away from the second cooling loop.

In a preferred embodiment, the first cooling loop comprises a first cooling agent and the second cooling loop comprises a second cooling agent, whereby the two cooling agents are different, preferably wherein first cooling agent is a non-dielectric cooling agent, and the second cooling agent is a dielectric cooling agent. Hence, the first cooling loop may be configured to provide heat dissipation from the vehicle elements to the first cooling agent, and the second cooling loop may be configured to take-up heat dissipated from the first cooling agent. The employment of a dielectric cooling agent may provide an electrical insulation. Thus, an electrical current flow through the cooling loop may be prevented due to the dielectric cooling agent. However, dielectric cooling agents may have a reduced thermal conductivity and be more expensive compared to non-dielectric cooling agents. Thus, the present invention provides the advantage that also non-dielectric cooling agents can be employed, and the cooling loops can be suitably adapted such that the use of the rather expensive dielectric cooling agent can be minimized. For instance, the second cooling loop comprising the more expensive dielectric cooling agent can be designed smaller compared to the first cooling loop comprising the cheaper non-dielectric cooling agent. It is noted that the present invention also includes configurations, wherein the first cooling agent is a dielectric cooling agent, and the second cooling agent is a non-dielectric cooling agent. The cooling agents may comprise or consist of ethylene glycol 50% solution. However, the present invention is not limited to this and also any other suitable cooling agent known in the art may be employed. In case a dielectric cooling agent is provided, the cooling agent may have a thermal conductivity of preferably about 0.06 to 0.15 W/mK. In case a non-dielectric cooling agent is provided, the cooling agent may have a thermal conductivity of preferably about 0.6 W/mK. In particular, the dielectric cooling agent may preferably define an electrical resistivity in a range about $10^{12}$ to $10^{14}$ Ω/cm.

In a preferred embodiment, the first and/or second cooling agents are fluids, preferably liquids. In a preferred embodiment, the first and/or second cooling agents comprise a mixture of water and glycol or a dielectric liquid. Fluids may encompass suitable gaseous cooling agents or liquid cooling agents. Employing fluids, in particular liquids, in the first and/or second cooling loops may enhance the thermal transport via heat convection. The employed fluids may also include mixtures of materials and suitable suspensions or emulsions. Furthermore, the heat exchanger may be configured to provide a heat exchange between the liquids of the first cooling loop and the second cooling loop while the liquids remain separated without mixing. The first cooling agent and the second cooling agent may comprise the same liquids or different liquids.

In a preferred embodiment, the vehicle elements comprise a traction battery, cables and/or a charging harness and the vehicle heat management system is configured to cool said traction battery, cables and/or the charging harness. Thus, the heat management system according to the present invention may be particularly adapted to provide sufficient cooling of the electrical vehicle elements. Since the traction battery, the cables and/or the charging harness may be operated under current, the heat management system according to the present invention may provide a safe and reliable way for cooling said elements while electrically isolating them for a safe operation.

The first cooling loop, the second cooling loop and the heat exchanger may be housed within a chassis of the vehicle. Thus, the heat management system according to the present invention may not require any additional parts externally arranged or connected from the outside of the vehicle but may provide a compact and closed system completely arranged within the vehicle. In another embodiment, respective connections may be provided to the first and/or second cooling loop, for instance to refill the cooling agents.

Further, the present invention proposes a vehicle, preferably an electric vehicle, comprising the heat exchanger or the vehicle heat management system according to the present invention. Thus, the vehicle may be safe in operation and reliably cooled, which is of particular importance when an electrical vehicle is provided, comprising respective high voltages and/or currents, e.g., during operation or charge of the traction battery. A respective cooling may improve charge rates of the battery and provide for a prolongation of a lifetime of the battery and the further electrical elements. Furthermore, a vehicle according to the present invention may allow to use cheaper non-dielectric liquids, which often comprise a higher efficiency in thermal dissipation. The heat management system according to the present invention therefore may allow to increase the versatility of selection for various electric vehicle platforms. In particular, the present vehicle heat management system may provide for an increased freedom to build in-vehicle installations and cable routing due to the cooling and simultaneous electrical isolation.

Further, the present invention proposes a method for managing heat in a vehicle by the vehicle heat management system according to the present invention, wherein the method comprises the steps of thermally coupling the first cooling loop and the second cooling loop via the heat exchanger; dissipating heat from one or more vehicle elements to the first cooling loop; dissipating heat from the first cooling loop to the second cooling loop via the heat exchanger, and electrically isolating the first cooling loop from the second cooling loop.

The method according to the present invention may accordingly provide an advantageous electrical isolation of the second cooling loop from the first cooling loop and may accordingly improve the safety of operation of the vehicle, while ensuring a proper cooling of the respective vehicle elements.

BRIEF DESCRIPTION OF THE DRAWINGS

The present invention is now described, by way of example with reference to the accompanying drawings, in which.

DETAILED DESCRIPTION

Figure 1:
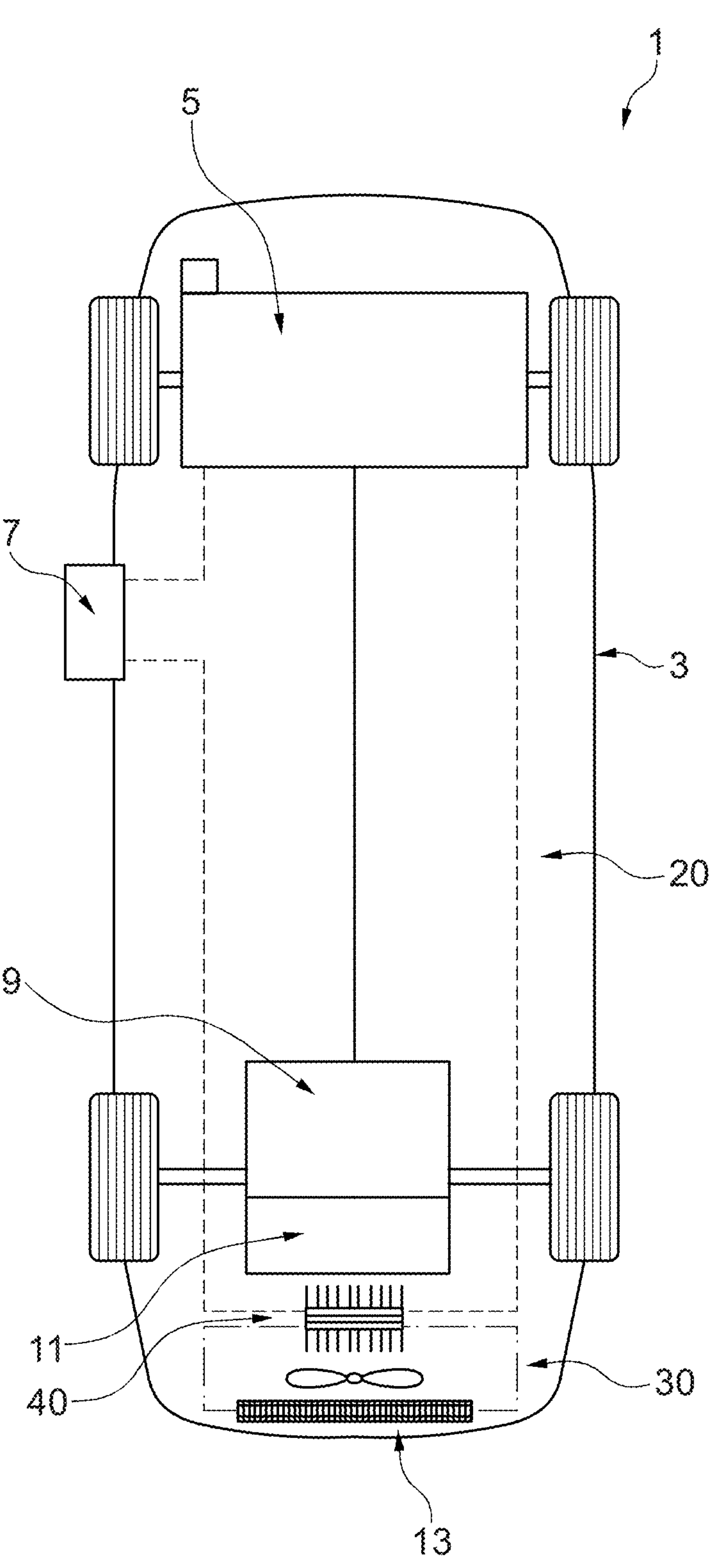
FIG. 1 shows a schematic view of a vehicle comprising the vehicle heat management system according to some embodiments.

FIG. 1 shows a cross-sectional schematic view of a vehicle 1, which comprises a vehicle heat management system according to the present invention. The vehicle 1, which is a BEV, comprises a traction battery 5 for powering an engine 11 and further comprises a transmission 9. The vehicle 1 further comprises a charge port 7 for charging the traction battery 5 via respective cables. The vehicle 1 further comprises a first cooling loop 20, which is adapted to cool the charge port 7, the traction battery 5 and the corresponding transmission cables by dissipating heat from said elements. The vehicle 1 further comprises a second cooling loop 30, which is connected to a radiator 13. The first and second cooling loops 20, 30 are thermally coupled by a heat exchanger 40. Thus, heat is dissipated from the traction battery 5, the charge port 7 and the corresponding cables and transferred from the first cooling loop 20 to the second cooling loop 30 via the heat exchanger 40, while electrically isolating the first cooling loop 20 from the second cooling loop 30. The heat is then further dissipated to the environment via the radiator 13.

Figure 2:
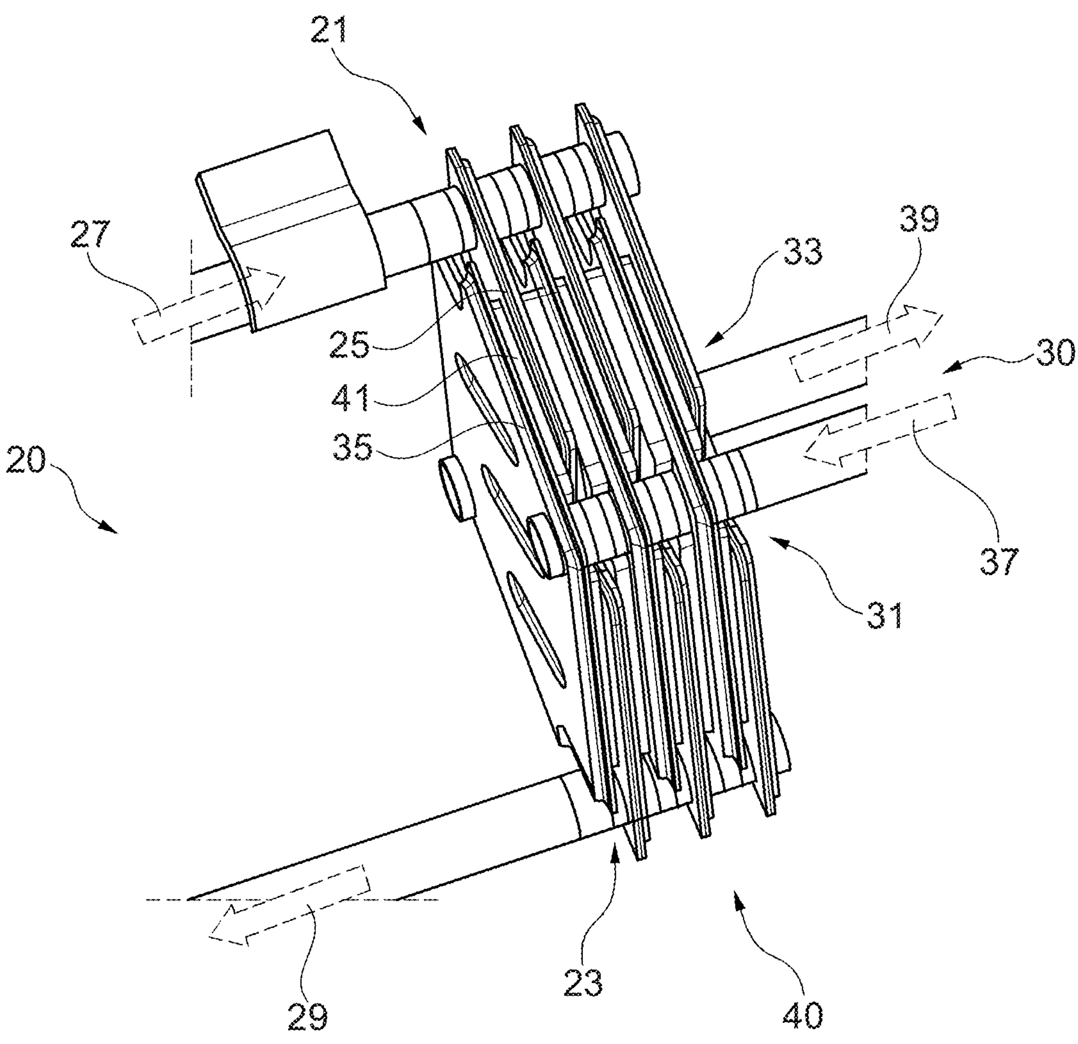
FIG. 2 shows a schematic view of a heat exchanger of the vehicle heat management system according to some embodiments.

FIG. 2 shows a schematic view of a heat exchanger 40, which is connected to the first cooling loop 20 and the second cooling loop 30. The heat exchanger 40 comprises a first hollow flow plate 25. The first hollow flow plate 25 is connected to the first cooling loop via the first cooling loop inlet 21, which provides an inflow of first liquid cooling agent in the inflow direction 27. Similarly, the first hollow flow plate 25 is connected to the first cooling loop 20 via the first cooling loop outlet 23, which provides an outflow of first liquid cooling agent in the outflow direction 29. The heat exchanger 40 further comprises a second hollow flow plate 35. The second hollow flow plate 35 is connected to the second cooling loop 30 via the second cooling loop inlet 31, which provides an inflow of second liquid cooling agent in the inflow direction 37. Similarly, the second hollow flow plate 35 is connected to the second cooling loop via the second cooling loop outlet 33, which provides an outflow of second cooling agent in the outflow direction 39. The first hollow flow plate 25 and the second hollow flow plate 35 are separated via a gap in which a thermal pad 41 is arranged. In the example shown, a heated first cooling agent is introduced at the first cooling loop inlet 21 at the top side of the first hollow flow plate 25. The first cooling agent then essentially diagonally flows through the first hollow flow plate 25 towards and out of the first cooling loop outlet 23 arranged at the bottom side of the first hollow flow plate 25. Further, in the example shown, a cooled second cooling agent is introduced at the second cooling loop inlet 31 at the top side of the second hollow flow plate 35. The second cooling agent then essentially diagonally flows through the second hollow flow plate 35 towards and out of the second cooling loop outlet 33 arranged at the bottom side of the second hollow flow plate 35. The first hollow flow plate 25 is accordingly most heated at its top side, while the second hollow flow plate 35 is most cooled at its top side. Hence, due to the thermal coupling of the first hollow flow plate 25 and the second hollow flow plate 35 via the thermal pad 41, heat is transferred from the first hollow flow plate 25 to the second hollow flow plate 35. Thus, the first liquid cooling agent accordingly cools down while the second liquid cooling agent accordingly heats up. The first liquid cooling agent continuously dissipates heat to the second liquid cooling agent on its way down to the first cooling loop outlet 23. Similarly, the second liquid cooling agent continuously takes up heat from the first liquid cooling agent and therefore continuously heats up on its way down to the second cooling loop outlet 33. The cooled first liquid cooling agent is then accordingly transferred back via the first cooling loop towards the respective elements to be cooled. Similarly, the heated second liquid cooling agent is accordingly transferred back via the second cooling loop towards a heat sink (not shown) to dissipate the uptaken heat. The thermal pad 41 ensures a proper heat transfer between the first hollow flow plate 25 and the second hollow flow plate 35 while electrically isolating the two hollow flow plates. Thus, two separate liquid cooling loops are established, which are thermally coupled to transfer heat but electrically isolated such that no electrical current can flow across the thermal pad 41. As is apparent from FIG. 2, the heat exchanger comprises a plurality of first hollow flow plates 25 and second hollow flow plates 35 with respective thermal pads arranged in the corresponding gaps. This stacked arrangement is shown and explained in greater detail in FIG. 3.

Figures 3A, 3B, 3C, 3D:
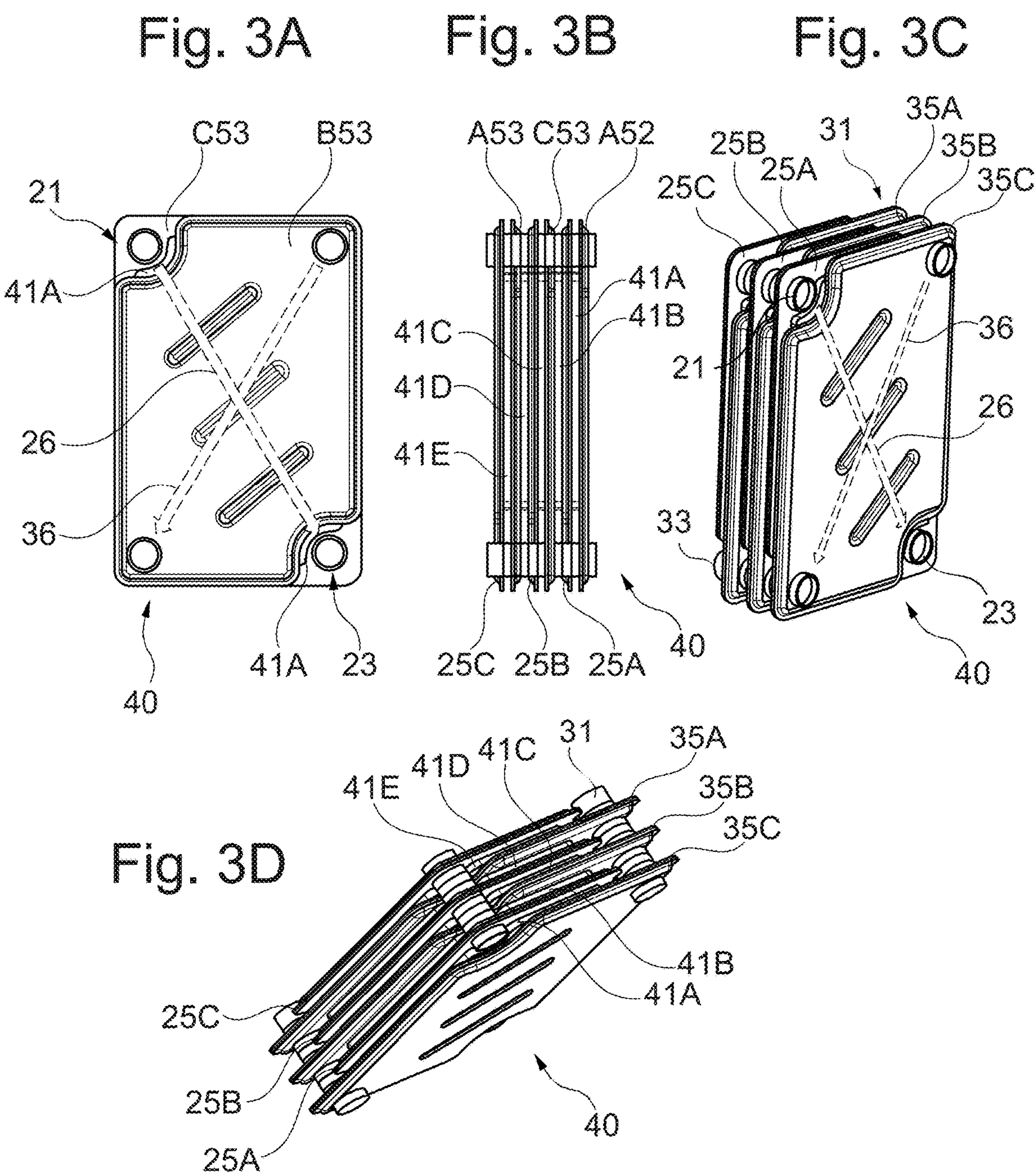
FIGS. 3A to 3D show multiple schematic views of a heat exchanger of the vehicle heat management system according to some embodiments.

FIGS. 3A-3D shows multiple schematic views of the heat exchanger of FIG. 2 in greater detail, namely in a front view (cf. FIG. 3A), in a side view (cf. FIG. 3B) and in two angled perspective views (cf. FIGS. 3C and 3D). As is depicted in FIGS. 3B to 3D, three first hollow flow plates 25A, 25B, 25C are stacked, while three second hollow flow plates 35A, 35B, 35C are similarly stacked such that the first and second hollow flow plates are arranged in an alternating manner. That is, the main surfaces of the respectively stacked hollow flow plates face each other. In each gap between the stacked first hollow flow plates 25A, 25B, 25C and second hollow flow plates 35A, 35B, 35C, five thermal pads 41A, 41B, 41C, 41D, 41E are arranged. Hence, the first and second hollow flow plates are thermally coupled via the thermal pads 41A, 41B, 41C, 41D, 41E such that heat can be dissipated from the first hollow flow plates 25A, 25B, 25C to the second hollow flow plates 35A, 35B, 35C, while simultaneously electrically isolating the hollow flow plates. The first hollow flow plates 25A, 25B, 25C are connected to the first cooling loop inlet 21, which accordingly supplies the first hollow flow plates 25A, 25B, 25C with the first liquid cooling agent. The second hollow flow plates 35A, 35B, 35C are similarly connected to the second cooling loop inlet 31 (cf. FIG. 2), which accordingly supplies the second hollow flow plates 35A, 35B, 35C with the second liquid cooling agent. As depicted, the first hollow flow plates 25A, 25B, 25C and the second hollow flow plates 35A, 35B, 35C are interconnected to allow a supply of each plate with first and second cooling agent, respectively.

As schematically indicated in FIG. 3A, the first liquid cooling agent essentially diagonally passes through the first hollow flow plates 25A, 25B, 25C towards the first cooling loop outlet 23 from an upper left to a lower right corner in a first flow direction 26, while the second liquid cooling agent essentially diagonally passes through the second hollow flow plates 35A, 35B, 35C towards the second cooling loop outlet 33 from an upper right to a lower left corner in a second flow direction 36. Thus, the flow directions of the first and second liquid cooling agents through the first and second hollow flow plates cross each other, as seen from the front side of the hollow flow plates.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A heat exchanger for a vehicle heat management system, the heat exchanger comprising:

at least one first hollow flow plate configured to be connected to a first cooling loop; and at least one second hollow flow plate configured to be connected to a second cooling loop, wherein the heat exchanger is configured to thermally couple the first cooling loop and the second cooling loop such that, in a coupled condition, heat is transferable from one or more vehicle elements to the first cooling loop and from the first cooling loop to the second cooling loop via the heat exchanger, wherein the heat exchanger is further configured to electrically isolate the first cooling loop from the second cooling loop, wherein each of the at least one first hollow flow plate and the at least one second hollow flow plate comprises at least one inlet configured to allow inflow of a cooling agent and at least one outlet configured to allow outflow of the cooling agent, and wherein each of the at least one first hollow flow plate and the at least one second hollow flow plate has an essentially rectangular shape, with the at least one inlet and the at least one outlet arranged in diagonally opposite corners to enable an essentially diagonal flow of fluid through hollow portions thereof.

2. The heat exchanger according to claim 1, wherein the first and second hollow flow plates comprise one or more flow channels for allowing cooling agent to flow through, and wherein the first and second hollow flow plates are arranged opposite each other and define a gap in between so that the first and second hollow flow plates are not in electrical contact with each other.

3. The heat exchanger according to claim 2, wherein at least one thermal pad is provided in the gap, wherein the thermal pad comprises a dielectric material which is configured to thermally couple the first hollow flow plate to the second hollow flow plate and electrically isolate the first hollow flow plate from the second hollow flow plate.

4. The heat exchanger according to claim 2, wherein the heat exchanger comprises a plurality of first hollow flow plates and a plurality of second hollow flow plates and wherein the first hollow flow plates and second hollow flow plates are arranged alternately in series forming respective gaps in between, wherein in each gap at least one thermal pad is arranged.

5. The heat exchanger according to claim 4, wherein the thermal pad comprises a solid body.

6. A vehicle comprising the heat exchanger according to claim 1.

7. The vehicle according to claim 6, wherein the vehicle is an electric vehicle.

8. A vehicle heat management system, comprising:

the heat exchanger according to claim 1;

the first cooling loop; and the second cooling loop which is separate from the first cooling loop.

9. The vehicle heat management system according to claim 8, wherein the second cooling loop is connected to a heat sink configured to dissipate heat from the second cooling loop to an environment.

10. The vehicle heat management system according to claim 8, wherein the heat sink is a radiator configured to dissipate heat from the second cooling loop to an environment.

11. The vehicle heat management system according to claim 8, wherein the first cooling loop comprises a first cooling agent and the second cooling loop comprises a second cooling agent, wherein the two cooling agents are different.

12. The vehicle heat management system according to claim 11, wherein the first cooling agent is a non-dielectric cooling agent, and the second cooling agent is a dielectric cooling agent.

13. The vehicle heat management system according to claim 11, wherein the first and/or second cooling agents are fluids.

14. The vehicle heat management system according to claim 11, wherein the first and/or second cooling agents are dielectric liquids.

15. The vehicle heat management system according to claim 11, the first and/or second cooling agents comprise a mixture of water and glycol.

16. An electric vehicle, comprising the vehicle heat management system according to claim 8.

* * * * *